United States Patent Office 3,451,842
Patented June 24, 1969

3,451,842
METHOD OF IMPREGNATING A FOAMED PLASTIC AND THE IMPREGNATED FOAMED PLASTIC
Fredrik Wilhelm Anton Kurz, Nysatravagen 12, Lidingo, Sweden, and Sverre Wikne, Salhus, Bergen, Norway
No Drawing. Filed Mar. 4, 1964, Ser. No. 349,473
Claims priority, application Norway, Mar. 7, 1963, 151,256
Int. Cl. B44d 1/06
U.S. Cl. 117—98                              3 Claims The present invention relates to a method of making impregnated plastic products suitable as insulating materials.

While it is relatively simple to provide a good heat insulation, which is usually achieved by providing closed air spaces, e.g., sheets of various materials having closed cells or pores, it is much more complicated to achieve a good sound insulation. In this connection, a distinction should be made between sound dampening in connection with the passage of sound from one room to another through a wall, floor or the like, and the room acoustics, in which only the reflection of the sound is to be reduced, which is important in public localities, work rooms, factories, etc. In both cases, however, it is necessary, rather than closed air cells, to have open intercommunicating cells which cause a change in the frequency of the sound waves. Room acoustics is the more simple problem, and can partly be solved by perforations in the ceiling surface or by suitable sound absorbents, while insulation of the transmitted sound requires more complex measures, e.g., uniting several sound reducing materials which have different frequencies and also a certain gravity, since a heavy material transmits vibration less than a light material.

There are not many substances which have open cells and usually they are too light to eliminate vibration or too fragile to be practically useful.

Materials of an ideal structure of intercommunicating cells are the elastic foamed plastics, e.g., polyurethane foam (moltoprene), polyester, polyether and latex types based on acrylics or vinylics, foamed rubber, cellulose sponge and other suitable foamed plastics. These substances, however, are too soft, not dimensionally stable and flammable. If, according to the present invention, they are impregnated with mineral substances, e.g., hydraulic slurries, such as gypsum or portland cement or ceramic setting substances, these mineral binders are applied around the foamed plastic structure while maintaining the open pores. While the hydraulic binders only need drying, the ceramic substances (clay) also have to be fired, whereby the structural substance is burnt off or carbonized, leaving a negative of fired clay with open cells. A similar effect can be achieved by heating a foamed plastic compound impregnated with alumina cement. Simultaneously it is achieved by the impregnation that the otherwise combustible foamed plastics become fire-retardant, in the case of clay even refractory, which has hitherto not been possible with foamed plastics. Before the impregnated foamed plastic sheets, which may consist of a continuous layer or of smaller loose pieces, e.g., waste material which is bounded by the hydraulic or ceramic binders, are dried they are flexible and can be applied to a support to take the shape thereof. Thus, it will be possible to make flat or molded, dimensionally stable elements.

As a mineral binder, water glass should particularly be mentioned. This has the disadvantage of having poor resistance to moisture, but this disadvantage can be removed by adding finely divided metal oxides, such as zinc oxide ZnO, titania $TiO_2$, ferric oxide $Fe_2O_3$, silica $SiO_2$, alumina $Al_2O_3$, antimony trioxide $Sb_2O_3$ etc. These metal oxides can also be supplied as pulverized minerals, e.g., talcum $Mg_3Si_4O_{10}(OH)_2$, feldspar $KAlSi_3O_8$, calcite $CaCO_3$, dolomite $CaMg(CO_3)_2$, perlite (about 70% $SiO_2$ and 20% $Al_2O_3$), even pulverized concrete, volcanic ashes, slags etc. Various mixtures of metal oxides or metal oxides with the above minerals are possible. It is very difficult, however, to mix and evenly distribute such powders of metal oxides or minerals in water glass. We have found, however, that this disadvantage can be avoided by small additions of dispersing or wetting agents, e.g., sodium alkylsulfonates, surface-active alkali-resistant fatty alcohols, but also lubricants, such as weak solutions, preferably below 1%, of guar gum, alginate, CMC or the like, but also stearates etc. The wetting agents, especially together with the finely divided metal oxides form with the water glass a gel, which gives full resistance to hydrolysis and full flame resistance. The effect can be improved by adding inorganic or organic salts which in the cold state have no influence on the water-resistance, but when heated yield vapors which have a gelling action on sodium silicate or which achieve the same effect by ion exchange. Examples include easily decomposing ammonium salts, e.g., ammonium bisulfate, ammonium chloride, ammonium tartrate, hexamethylenetetramine and ferric chloride etc. Neutralization by adding inorganic or organic acids can act in the same direction. It may also have advantages if the water glass is polymerized.

Impregnation can be carried out by compressing thin and thick parts or plies of soft foamed plastic, e.g., by rolling and immersing them into a bath of gypsum (anhydrite) slurry, cement slurry, water glass (silicate) together with metal oxides or minerals or clay. When the pressure is released, the liquid is sucked into the foamed plastic. This treatment can be repeated to get the mineral slurry sufficiently deeply and strongly into the product. Thereby, it is also possible to control the extent of impregnation in the different layers, which is often an advantage since thereby the density and the frequency can be varied. Absorption can also be carried out by applying the slurry in the same manner as the ink in a printing press, by vacuum or any other suitable technique.

To improve the binding capacity, dispersing or binding accelerating agents can be added to the slurry, e.g., the gypsum slurry or the foamed plastic itself can get a stronger consistency by an addition of latex, polyvinyl acetate or urea formaldehyde resin (optionally together with sulfite waste liquor) and the fluidity improved, e.g., by means of lignin products or the like. Various plastics can also be used for this purpose. Similar additions can be used in cement, water glass and clay.

Impregnation can also be improved by addition of evenly dispersed mineral substances in pulverulent or fibrous form, e.g. glass or metal powder, fiberglass, perlite, kieselguhr, stone flour (diatomaceous earth) or the like, either to the slurry or already during foaming. To make the final product lighter, foaming agents or the like can also be added to the slurry.

EXAMPLE 1

100 parts by weight of gypsum (plaster of Paris) are stirred with 80 parts by weight of water to form a fluid slurry. A piece of soft polyurethane foam of a thickness of e.g. 2 to 10 mm. is placed on the bottom of a trough. The slurry is poured over until the plastic is completely covered and is worked in well by rolling or pressing, whereby the air is squeezed out, whereupon the pores open again on account of the resiliency of the material and the slurry is sucked into the pores.

EXAMPLE 2

As in Example 1, except that latex or polyvinyl acetate is added to the slurry.

EXAMPLE 3

To 100 parts by weight of gypsum are added 30 parts by weight of urea formaldehyde resin in syrupy form, after the syrup has been mixed with 60 parts of water and a sufficient amount of an accelerator, e.g. ammonium sulfate, to cause the resin to harden within from 0.5 to 1 hour. The aqueous solution is mixed with the gypsum, whereupon the slurry is used as an impregnating agent as in Example 1.

EXAMPLE 4

200 parts by weight of common portland cement are mixed well with 80 parts by weight of water, optionally with addition of an accelerator or a plasticizing agent, which improves the water-cement ratio and accelerates setting, whereupon the slurry is worked into foamed plastic as in Example 1.

EXAMPLE 5

To impregnate 1,000 ml. of polyurethane foam the following bath is prepared. To 320 g. water glass (34.6%) a small amount of a surface-active agent is added, e.g. sodium alkylsulfonate, whereupon 15 g. MgO, 15 g. ZnO and 15 g. $TiO_2$ are added. This mixture is forced into a 1 cm. thick sheet of polyurethane foam by rolling. Drying at a temperature between 100 and 135° C.

EXAMPLE 6

The bath can also have the following composition: 275 g. of water glass, a few drops of a 1% guar solution and 75 g. of talcum.

EXAMPLE 7

A slurry of clay and water in the proportions commonly used in ceramics, is employed. The foamed plastic is placed on a sealing base, e.g. of rubber, in a hermetically sealed container. While the slurry is introduced, air is pumped out, and at the same time the slurry is sucked into the foamed plastic.

Inlays of steel wire mesh screen, fiberglass sheets or fabrics and the like can further improve the mechanical strength of the impregnated foamed plastic sheets.

By adding bituminous substances, the resistance to moisture, and by adding e.g. silicates, boron or phosphorus compounds or other agents suitable for that purpose, the fire resistance can be further improved.

The foamed plastic sheets prepared by the impregnating procedure of this invention can be used as such but also in combination with other materials, with which they are united. Thereby, the impregnated foamed plastic sheets can be reinforced while the other sheets become more resilient and obtain an improved insulating capacity. If an impregnated foamed plastic sheet is bonded (adhesively joined) to a sheet of expanded polystyrene, this will not crack so easily and its shrinkage is prevented. A mineral fiber plate obtains a highly improved strength by this combination. Other combinations are e.g. with conventional or porous boards of gypsum or concrete, fiberboard, particle board, asbestos cement, metal, glass etc.

The combination of insulating elements can also be made by foaming urethane plastic or polystyrene between two rigid plates of boards of other material or of impregnated foamed plastic, whereby the foaming material is well joined to outer plates or boards without the necessity of using a special adhesive agent. If, e.g. a hard moltoprene is foamed between two outer sheets, of which one or both may be impregnated foamed plastic, an excellent unit is obtained which gives both sound and heat insulation.

As above mentioned, the impregnation in the various layers may be made with differing intensity, whereby the sound insulation can be improved by the varying frequency. The same effect can be achieved by joining together different layers of different density or of different materials.

Thus, e.g. one can interpose between two sheets, of which one or both consist of impregnated foamed plastic, a sheet of corrugated paperboard or material of similar nature. If two or more plies of corrugated paperboard are disposed so that the channels extend in different directions, the frequencies are changed and the sound insulation is improved. The channels can also be filled wholly or partly with insulating materials. It is always an advantage if the different plies are of varying character as regards rigidity, resiliency and density.

One can improve the heat resistance of insulating tubes (bowls) of plastic by covering them interiorly with bent layers of impregnated foamed plastic, which can also be coated with a heat-reflecting metal foil. This applies to insulating tubes of polystyrene as well as polyurethane. The latter can also be impregnated directly. Impregnated insulating tubes of plastic can also be used for impregnating hot conduits which has not been possible hitherto.

By joining a glass plate to an impregnated foamed plastic sheet, the glass can be made non-shattering, since in the event of a break the glass is retained by the plastic and no fragments can fall out. The glass can also be provided with a layer of thermosetting plastic and/or also with a layer of fiberglass, whereby the coherence is further improved. If the glass plate is pigmented or provided with a metallized layer by powdering or by flame-spraying etc., one obtains a decorative surface, which affords possibilities for building glass (facade glass).

The per se decorative surface of impregnated foamed plastic can be further decorated by anchoring metal powder or small pieces of quartz, granite, marble or the like in the surface.

The clay-impregnated foamed plastic sheets can also be glazed on one side for producing decorative insulating floor or wall tiles.

On account of their decorative appearance and moldability (prior to drying or firing) there is a wide applicability of the novel material even outside insulation, and as main groups the following can be mentioned:

(1) Acoustics boards for reducing echo action of sound. The finely porous surface absorbs a great portion of the sound. The impregnated foamed plastic boards can be used alone or combined with a backing plate of other material. The surface or the entire board can be perforated in a well known manner. Furthermore, the board can be profiled (shaped) or corrugated (bent) to improve the sound absorption. Whilst profilation is performed by suitable cutting of the plastic foam before impregnation, bending is made after impregnation before the mineral slurry has set and gets stiff.

(2) Partition walls to dampen sound transmission. There it is advantageous to combine several layers of varying density so that the sound waves are broken. The varying density can be achieved either by having a heavier impregnation on one side than on the other or having the central layer less or not at all impregnated or by assembling different elements into a unit. It is also possible to combine with heat-insulating layers. It is possible to make two elements which are assembled with an air space therebetween. Often it is advantageous to have a metal foil as a vapor barrier. The surface facing the room can be of a stronger material which makes for a strength sufficient to hang or attach even heavy objects on the wall.

(3) Fused (grid) floors, optionally in combination with heat-insulating layers.

(4) External facing elements, or the like, in which case the preferably with cement or clay impregnated foamed plastic may form the outward surface or be placed inwardly, in which latter case the outward layer may be concrete, bricks, metal or glass etc. If the foamed plastic layer forms the outward surface it is advantageous to decorate it with small stones or metal powder. For facing elements it is always of importance that a metal foil is applied to the inner face or as a suitable interposed layer.

If small particles of foamed plastics (which may also have closed cells) are admixed to gypsum, cement, water glass or clay or slurries thereof, porosity is achieved throughout the material. In this case it is also possible to burn away the foamed plastic by heating, leaving only the cells with the structure of the foamed plastic in the matrix or gypsum, concrete, silicate or clay. This is a great advantage as compared to admixture and burning of other small organic particles, since the absorption of the mineral substance gives a much finer porosity, a better insulating effect and greater strength. In this case, waste material can also be used, which renders the production inexpensive. In this manner it is possible to obtain improved porous elements, boards, etc. of gypsum, concrete, clay etc.

Impregnated small particles, in the case of clay after firing, may also be used as a loose insulating and filling material.

These examples, however, include only a part of the possible applications.

We claim:

1. A method of making a non-flammable insulating material of porous structure, which comprises impregnating a body of open-pored foamed plastic material with a slurry of an inorganic settable material and bituminous materials and carrying out such impregnation to such an extent that the walls of the pores of said plastic body are covered with the impregnating material, while the pores remain open, and causing the settable inorganic material to set to form a skeleton of hardened inorganic material covering the pore walls while leaving the pores open.

2. A method of making a non-flammable insulating material of porous structure, which comprises impregnating a body of open-pored foamed plastic material with a slurry of an inorganic settable material and at least one dispersed mineral taken from the group consisting of glass powder, metal powder, fiberglass, perlite, kieselguhr and stone flour and carrying out such impregnation to such an extent that the walls of the pores of said plastic body are covered with the impregnating material, while the pores remain open, and causing the settable inorganic material to set to form a skeleton of hardened inorganic material covering the pore walls while leaving the pores open.

3. A non-flammable insulating material of porous structure comprising an open-pored foamed plastic material and a skeleton of hardened inorganic material and at least one mineral taken from the group consisting of glass powder, metal powder, fiberglass, perlite, kieselguhr and stone flour, covering the pore walls of said plastic material.

References Cited

UNITED STATES PATENTS

| 1,996,271 | 7/1934 | Twiss et al. | 117—136 |
| 2,076,295 | 4/1937 | Curs et al. | 260—2.5 |
| 2,200,850 | 5/1940 | Miserentino | 117—137 |
| 2,257,911 | 10/1941 | Kraft | 117—98 |
| 2,964,424 | 12/1960 | Mast | 117—98 |
| 3,057,750 | 10/1962 | Bennett et al. | 117—98 |
| 3,061,468 | 10/1962 | Tryon | 117—98 X |
| 3,055,360 | 9/1962 | Turkewitsch | 117—98 X |
| 3,094,433 | 6/1962 | Bugosh et al. | 117—98 |
| 3,232,786 | 2/1966 | Kellman | 117—98 |
| 3,000,144 | 9/1961 | Kitson | 52—309 |
| 3,257,229 | 6/1966 | Nielsen | 117—100 |

WILLIAM D. MARTIN, *Primary Examiner.*

T. G. DAVIS, *Assistant Examiner.*

U.S. Cl. X.R.

117—137, 138, 138.8